(12) United States Patent
Ibrahim (10) Patent No.: US 7,830,125 B2
(45) Date of Patent: Nov. 9, 2010

(54) ANTI-SWELL PROTECTION CIRCUIT FOR BATTERY CELLS

(75) Inventor: Randolph A. Ibrahim, Sedalia, CO (US)

(73) Assignee: Nexergy, Inc., Columbus, OH (US)

( * ) Notice: Subject to any disclaimer, the term of this patent is extended or adjusted under 35 U.S.C. 154(b) by 715 days.

(21) Appl. No.: 11/858,791

(22) Filed: Sep. 20, 2007

(65) Prior Publication Data

US 2009/0079397 A1 Mar. 26, 2009

(51) Int. Cl.
*H02J 7/00* (2006.01)
(52) U.S. Cl. .......... 320/136; 320/134
(58) Field of Classification Search .......... 320/134, 320/136
See application file for complete search history.

(56) References Cited

U.S. PATENT DOCUMENTS 4,871,553 A * 10/1989 Huhndorff .......... 429/61
2006/0267545 A1* 11/2006 Lee et al. .......... 320/106

\* cited by examiner

*Primary Examiner*—Edward Tso
*Assistant Examiner*—Samuel Berhanu
(74) *Attorney, Agent, or Firm*—Townsend and Townsend and Crew LLP (57) ABSTRACT

The present invention provides a protection circuit and method for preventing a battery from swelling in one embodiment. The protection circuit includes: a voltage monitoring circuit that monitors a voltage across the battery; a control circuit that receives voltage information from the voltage monitoring circuit; and a discharge circuit that turns on to discharge the battery upon receiving a signal from the control circuit. The control circuit includes: a timer that sets predetermined time periods; a signaling section that outputs the signal to the discharge circuit after a first predetermined time period if the voltage stays above a first predetermined voltage threshold without charging or discharging to a load for the first predetermined time period; a sleep mode applying section that applies a sleep mode when the voltage falls below a second predetermined voltage threshold; and a load disconnecting section that disconnects the load if a wake-up command is not issued during the sleep mode for a third predetermined time period. Alternatively, the protection circuit may include a swell monitoring device that monitors a swell associated with the battery; a control circuit that receives swell information from the swell monitoring device; and a discharge circuit that turns on to discharge the battery upon receiving a signal from the control circuit.

23 Claims, 5 Drawing Sheets

ANTI-SWELL PROTECTION CIRCUIT FOR BATTERY CELLS

BACKGROUND OF THE INVENTION

The present invention relates to a method and circuit for preventing batteries from swelling.

Lithium Sulfur (LiS) rechargeable batteries provide users with high-energy and light-weight solutions. For example, LiS batteries developed by Sion Power™ Corporation, Tucson Ariz., are reported to be capable of delivering a specific energy of 400 Wh/kg and an energy density of 425 Wh/liter. The specific energy of the LiS battery exceeds that of state-of-the-art Lithium Ion chemistry by a factor of greater than two, while the energy density stands at an equivalent level. That is, a LiS battery provides the same runtime for a portable computer in less than half the weight, or twice the runtime in the same weight while having a volume comparable to a Lithium Ion battery. Another reported advantage of LiS batteries is their ability to work well in very cold weather. Typical applications include unmanned aerial vehicles, military communication systems, rugged notebook computers, tablet personal computers, and portable medical devices.

Recently, there have been numerous reports claiming battery swelling in certain types of notebook/laptop computers. In mild case, batteries swell but remain functional. In these cases, keyboard and/or trackpad functionality is affected by the rising of internal components. In severe cases, the swelling is striking enough to bulge the bottom of the notebook/laptop case, and sudden shutdowns are experienced due to non-functional batteries. Battery swelling is typically the final stage before explosion. Some reports address extreme cases wherein batteries caught fire with explosive force. According to one report, the laptop computer was charging at the time of fire but not in use (asleep with the lid shut). Generally, these are Lithium Ion (Li Ion) batteries, and the cause of swelling is considered to be overheating. Due to such safety problems associated with certain types of Li Ion batteries, some computer manufacturers are now opted for Lithium Polymer (Li Po) batteries: one of the supposed advantages of Li Po batteries is reduced combustibility.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If the notation "-m" is used for the second reference label in the specification, the description is applicable to any one of the components having the same first reference label with different second labels 1 through n, where $1 \leq m \leq n$.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

LiS batteries can swell. It has been observed that if LiS batteries are left in a charged state (above a certain high charge threshold), they can swell over time, for example, in about a week. It has also been observed that if LiS batteries are left in a lower-charged state (below a certain low charge threshold), they can swell under certain conditions. The swelling phenomenon seems to depend on ambient conditions such as temperature. In view of the safety issues surrounding battery swelling, the present invention provides an anti-swell protection circuit for preventing swelling, in particular, but not by way of limitation, of LiS batteries.

Figure 1:
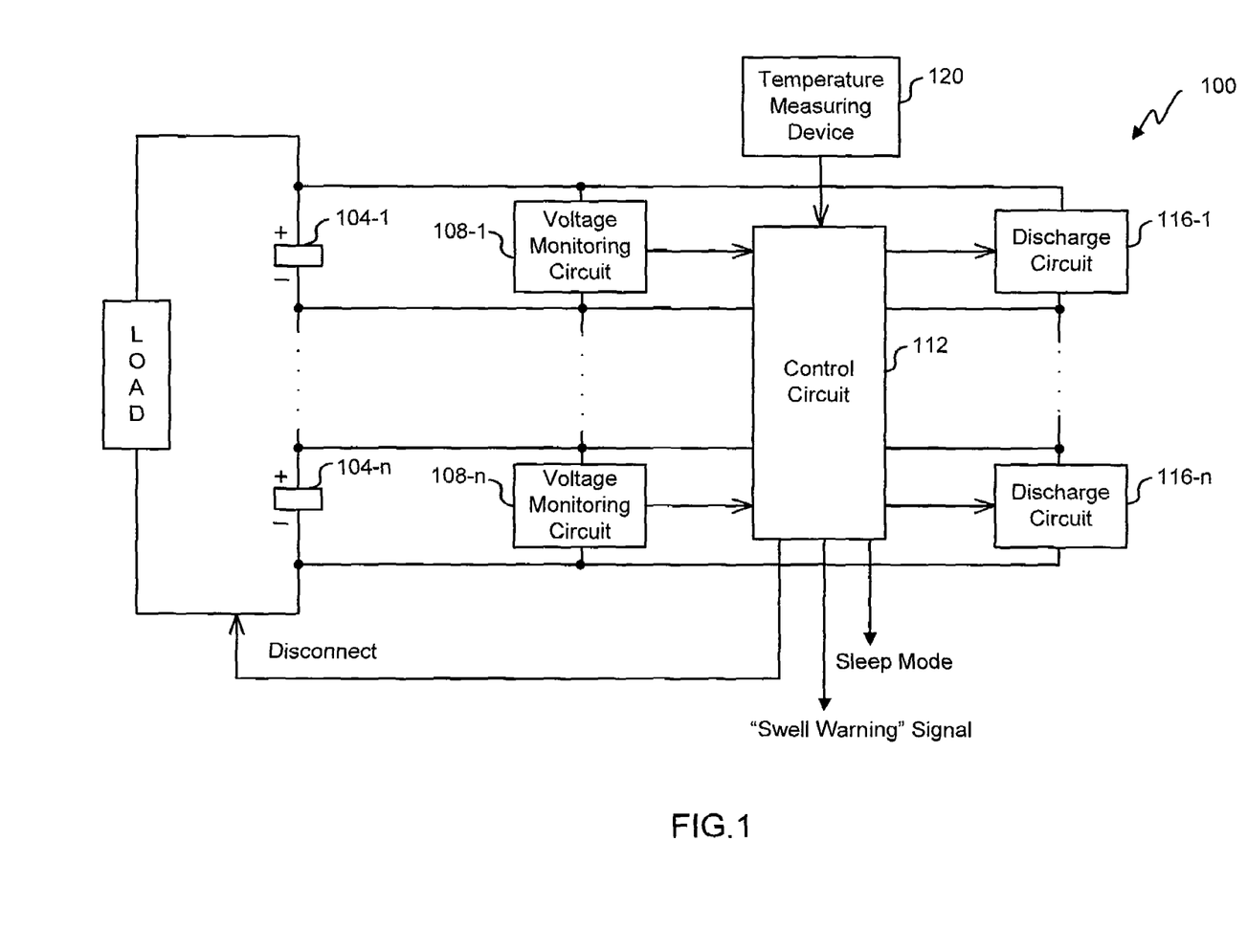
FIG. 1 is a block diagram showing the first embodiment of the present invention for preventing batteries from swelling.

FIG. 1 is a block diagram showing an anti-swell protection circuit 100 according to a first embodiment of the present invention. The anti-swell protection circuit 100 is coupled to a number of batteries 104-1 through 104-n connected in series in a pack. This figure depicts a situation where an external load is also attached to the battery pack. The anti-swell protection circuit 100 comprises a number of voltage monitoring circuits 108-1 through 108-n, a control circuit 112, and a number of discharge circuits 116-1 through 116-n coupled to the number of voltage monitoring circuits 108-1 through 108-n, respectively, through the control circuit 112, as well as to the batteries 104-1 through 104-n, respectively. The anti-swell protection circuit 100 may additionally include a temperature measuring device 120. The control circuit 112 includes a timer, whose settings may be controlled by the readings from the temperature measuring device 120.

In this first embodiment, the voltage monitoring circuits 108-1 through 108-n monitor individual cell voltages. During normal operations, the voltage increases as the battery charges, and the voltage decreases as it discharges. As mentioned earlier, it has been reported that swelling of a LiS battery occurs when it is left unused in a charged state (above a certain high charge threshold) for a certain time period, that is, when there is no discharging activity of the battery sourcing energy to the load or when there is no charging from a charger for the certain time period. The voltage monitoring circuits 108-1 through 108-n monitor voltages of the batteries 104-1 through 104-n, respectively, to determine if there are any charging or discharging activities, and sends the voltage information to the control circuit 112. The control circuit 112 determines if each of the voltages has stayed above a first predetermined voltage threshold corresponding to a first predetermined charged state for a first predetermined time period, for example, five days since the last battery activity. The first predetermined charged state can be anywhere in the range of 55%-95% of full charge. In various embodiments, the percentage can be 60%, 65%, 70%, 75%, 80%, 85% or 90%, for example. The first predetermined time period is set by the timer incorporated in the control circuit 112. To prevent swelling, the first predetermined time period is predetermined to be shorter than the typical time period it takes for a LiS battery to start swelling in the charged state. If there has been no charging or discharging activity and the voltage across the battery 104-*m* has stayed above the first predetermined voltage threshold for the first predetermined time period, the control circuit 112 sends an ON signal to the discharge circuit 116-*m*.

Upon receiving the ON signal from the control circuit 112, the discharge circuit 116-*m* turns on to discharge the battery 104-*m* slowly with the discharging rate, i.e., discharging current of 10 mA to 1000 mA in the present embodiment to provide a stable state for the battery 104-*m*. Thus, the stable state of the battery 104-*m* can be provided with the discharging current of 10 mA, 20 mA, 50 mA, 75 mA, 100 mA, 200 mA, 300 mA, 400 mA, 500 mA, or 1000 mA, for example. Note, however, the discharging current can take on any value between 50 μA and the maximum discharging current the cell manufacture will allow depending on the application. For example, the maximum discharging rate of a LiS battery from Sion Power™ is rated at 2C. This means that the LiS battery delivers the discharging current of 4.4 A for 0.5 hour at 2C with the normal capacity of 2.2 Ah. The slow discharging continues until the voltage decreases to a second predetermined voltage threshold, which corresponds to a second predetermined charged state. The second predetermined charged state can be 5%-45% of full charge. In various embodiments, the percentage can be 10%, 15%, 20%, 25%, 30%, 35% or 40%, for example. The control circuit 112 sends an OFF signal to the discharge circuit 116-*m* when the voltage of the battery 104-*m* falls below the second predetermined voltage threshold. Upon receiving the OFF signal from the control circuit 112, the discharge circuit 116-*m* turns off and the slow discharging of the battery 104-*m* stops.

The slow discharging is done for the number of batteries 104-1 through 104-*n* individually by use of the respective discharge circuits 116-1 through 116-*n*. Depending on the initial voltage and battery chemistry, some batteries may reach the second predetermined charged state fast and the others may do so slowly. There may be even some batteries that initially had voltages already below the first predetermined voltage threshold. In this case, the corresponding discharge circuits do not turn on to slowly discharge those batteries to the second predetermined charged state, because the ON signals are not transmitted from the control circuit 112 to the corresponding discharge circuits. Thus, at the time when one battery 104-*k*, where $1 \leq k \leq n$, has reached the second predetermined charged state first among the number of batteries 104-1 through 104-*n*, the other batteries may be still in some higher charged states than the second predetermined charged state.

As mentioned earlier, swelling can occur when a LiS battery is left not only in a charged state (above a certain high charge threshold) but also in a lower-charged state (below a certain low charge threshold). To prevent swelling in the lower-charged state even in one battery, the voltage monitoring circuit 108-*k* monitors the voltage across the battery 104-*k*, which has reached the second predetermined charged state first among the number of batteries 104-1 through 104-*n* in the pack, and sends the voltage information to the control circuit 112. The control circuit determines if the voltage across the battery 104-*k* has stayed below the second predetermined voltage threshold corresponding to the second predetermined charged state, without charging or discharging, for a second predetermined time period, as set by the timer in the control circuit 112. The starting point of the second predetermined time period is the time when the first battery 104-*k* falls below the second predetermined voltage threshold and the discharge circuit 104-*k* turns off. The second predetermined time period can be predetermined to be any time period shorter than the typical time period it takes for a LiS battery to start swelling in the lower-charged state. In an alternative embodiment, the control circuit may be configured to determine if the individual voltages across two or more batteries have stayed below the second predetermined voltage threshold, without charging or discharging, at least for the second predetermined time period.

In one embodiment, the control circuit 112 may be configured to emit a "swell warning" signal after the slow discharging starts in order to inform users that the batteries were under the conditions for swelling to occur, having triggered the discharge circuits to turn on for the swell prevention. Upon noticing the "swell warning" signal, the user may activate the load, thus resuming discharging of the batteries sourcing energy to the load. The "swell warning" signal may be started, for example, when at least one battery reaches a half-charged state, i.e., 50% of full charge, to warn the user of charging needs. The user may then attach a charger to charge the batteries.

Once the second predetermined time period has elapsed without charging or discharging activities, the control circuit 112 puts the entire circuit into a sleep mode. Thus, the entire circuit enters a low-current mode, which provides a stable state for the batteries 104-1 through 104-*n* and saves energy consumption when most devices are idle. A wake-up command resumes normal operations. If there is no wake-up command or charging by the user for a third predetermined time period as set by the internal timer, the control circuit 112 automatically disconnects the load via an enable/disable function, for example.

The first and second predetermined time periods, beyond which some of the batteries 104-1 through 104-*n* may swell if unused, can be varied depending on ambient temperature. This is based on considerations that the battery swelling, which is believed to exhibit the Arrhenius behavior, progresses rapidly when the ambient temperature is high; and the battery swelling progresses slowly when the ambient temperature is low. Therefore, the anti-swell protection circuit 100 may further include a temperature measuring device 120, wherein depending on the readings, the first predetermined time period can be adjusted for the timer internal to the control circuit 112, such that the batteries are allowed to be left unused in the charged state (above the first predetermined charged state) for only a short period of time, e.g. 3 days, when the ambient temperature is above a predetermined value; and the batteries are allowed to be left in the charged state for a long period of time, e.g. 10 days, when the temperature is below the predetermined value. Similarly, the second predetermined time period can be adjusted depending on the temperature readings from the temperature measuring device 120.

Figure 2:
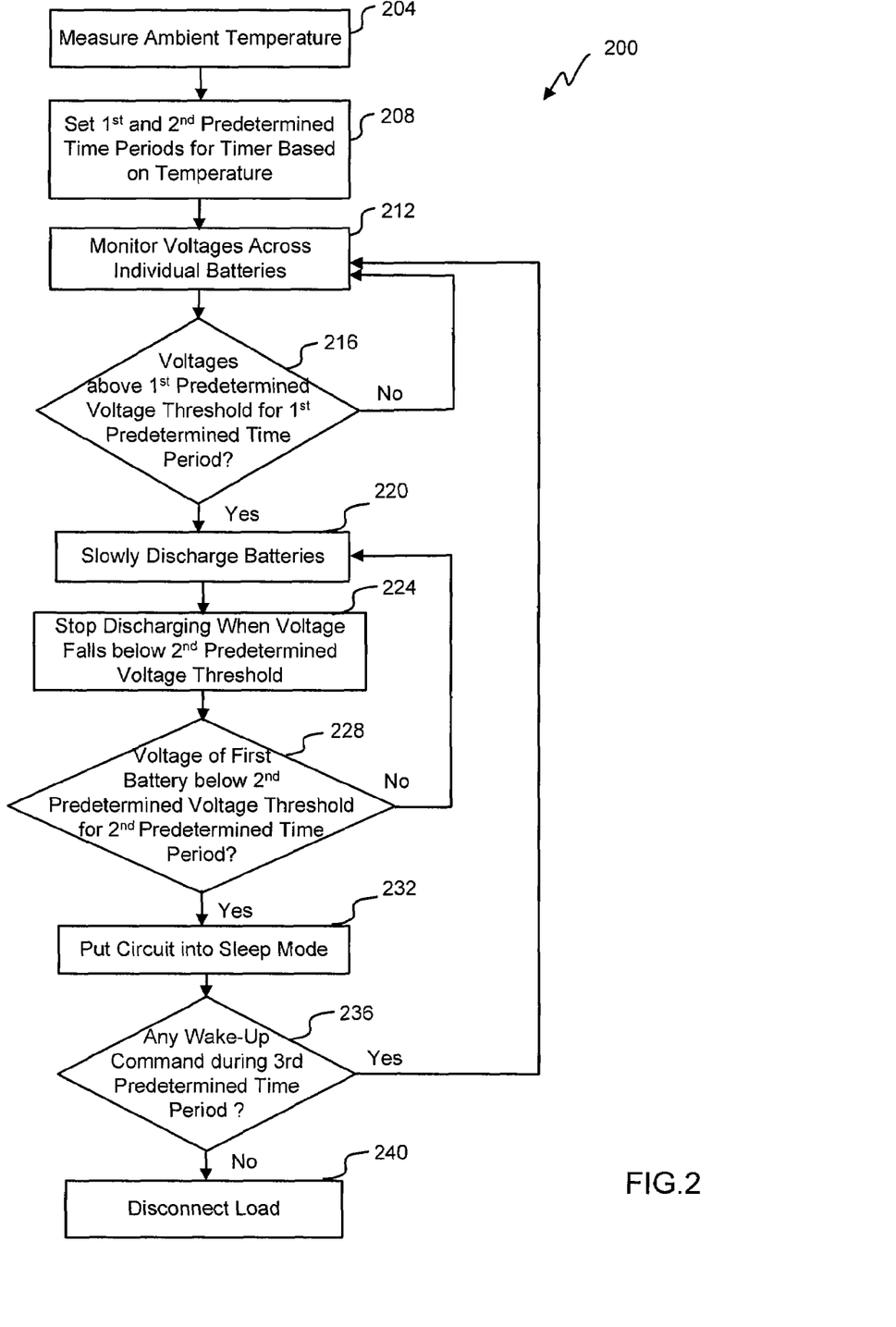
FIG. 2 is a flow diagram showing the process of the first embodiment of the present invention for preventing batteries from swelling.

FIG. 2 is a flow diagram showing an anti-swell protection process 200 according to the first embodiment of the present invention. First, at block 204, ambient temperature is measured by the temperature measuring device 120 to determine the first and second predetermined time periods at block 208 to be used by the timer in the control circuit 112. Practically, the first predetermined time period is the allowable time limit for the batteries 104-1 through 104-*n* to be in the charged state (above the first predetermined charged state) without charging or discharging; and the second predetermined time period is the allowable time limit for the batteries to be in the lower-charged state (below the second predetermined charged state) without charging or discharging. Individual voltages across the number of batteries 104-1 through 104-*n* in the pack are monitored at block 212 by the voltage monitoring circuits 108-1 through 108-*n*, respectively. Upon receiving the voltage information from the voltage monitoring circuits 108-1 through 108-*n*, the control circuit 112 determines, at block 216, if each of the voltages has stayed above the first predetermined voltage threshold without discharging activities of the battery sourcing energy to the load or charging from a charger for the first predetermined time period as set by the internal timer. When the first predetermined time period elapses, the batteries 104-1 through 104-*n* are slowly discharged by the respective discharge circuits 116-1 through 116-*n* at block 220.

The control circuit 112 may optionally be configured to emit "swell warning" signals after the slow discharging starts. At block 224, the slow discharging stops when the voltage monitoring circuit 108-*m* detects that the voltage fell below the second predetermined voltage threshold, indicating that the battery 104-*m* has reached the second predetermined charged state. At block 228, it is determined if the voltage that fell below the second predetermined voltage threshold first has stayed below the second predetermined voltage threshold, without increase due to charging, for the second predetermined time period. If so, the entire circuit is put into a sleep mode at block 232. Alternatively, the control circuit 112 may be configured to determine if the individual voltages across two or more batteries have stayed below the second predetermined voltage threshold, without charging or discharging, at least for the second predetermined time period. At block 236, it is determined if there is any wake up command during the third predetermined time period. If none, the load is disconnected at block 240.

In a second embodiment, upon receiving the ON signal from the control circuit 112, the discharge circuits 116-1 through 116-*n* start slowly discharging the batteries 104-1 through 104-*n*, respectively, until at least one battery reaches the second predetermined charged state. The entire circuit is put into a sleep mode when the at least one battery has reached the second predetermined charged state, that is when at least one voltage has decreased to the second predetermined voltage threshold. Thus, in this embodiment, there is no phase where any of the batteries stay near or below the second predetermined charged state without discharging or charging activities. In other words, the second predetermined time period is non-existent in this second embodiment unlike in the first embodiment.

Figure 3:
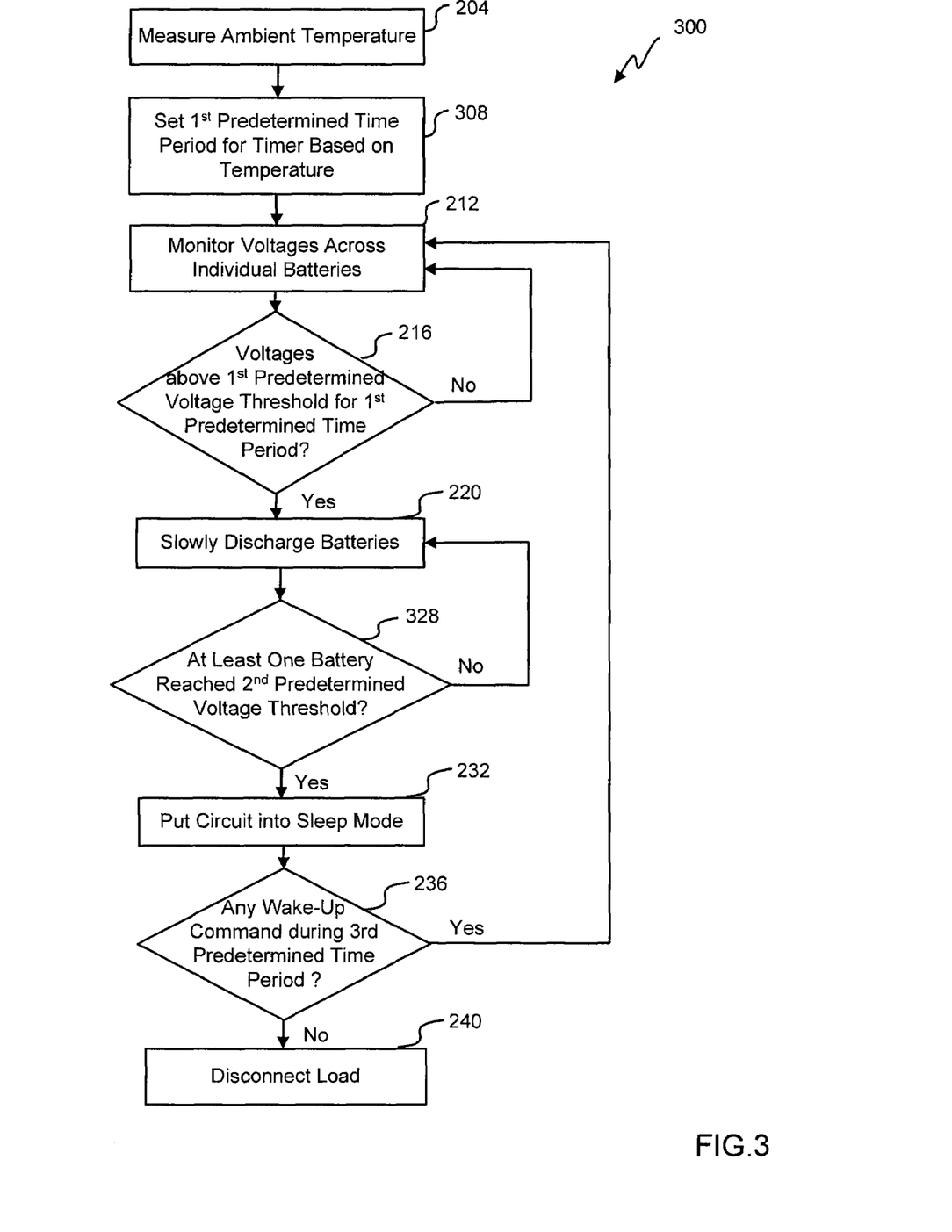
FIG. 3 is a flow diagram showing the process of the second embodiment of the present invention for preventing batteries from swelling.

FIG. 3 is a flow diagram showing an anti-swell protection process 300 according to the second embodiment of the present invention. In this embodiment, upon receiving the ON signal from the control circuit 112, the discharge circuits 116-1 through 116-*n* start slowly discharging the batteries 104-1 through 104-*n*, respectively, until at least one battery reaches the second predetermined charged state, as determined at block 328. The entire circuit is put into a sleep mode when the at least one battery has decreased to the second predetermined charged state, that is when at least one voltage monitoring circuit 108-*m* detects that the voltage across the least one battery has decreased to the second predetermined voltage threshold. The remaining blocks are the same as those in the first embodiment.

In general, mechanical swelling can be measured by a strain gauge, which is a device used to measure deformation (or strain) of an object. For the case of a typical foil strain gauge, a metallic foil therein is deformed as the object is deformed, causing its electrical resistance to change. This resistance change is thus related to the strain. Using this relationship, the strain value of the object is obtained. With careful installation, strains up to at least 10% can be measured. For measurements of small strain, semiconductor strain gauges, so called piezoresistors, are often used. The mechanism of a piezoresistor is based on the piezoresistive effect that describes the electrical resistance change of a sensing material due to applied mechanical stress. Examples of the materials incorporated in semiconductor strain gauges are silicon, germanium, silicon carbide, amorphous silicon, etc.

Figure 4:
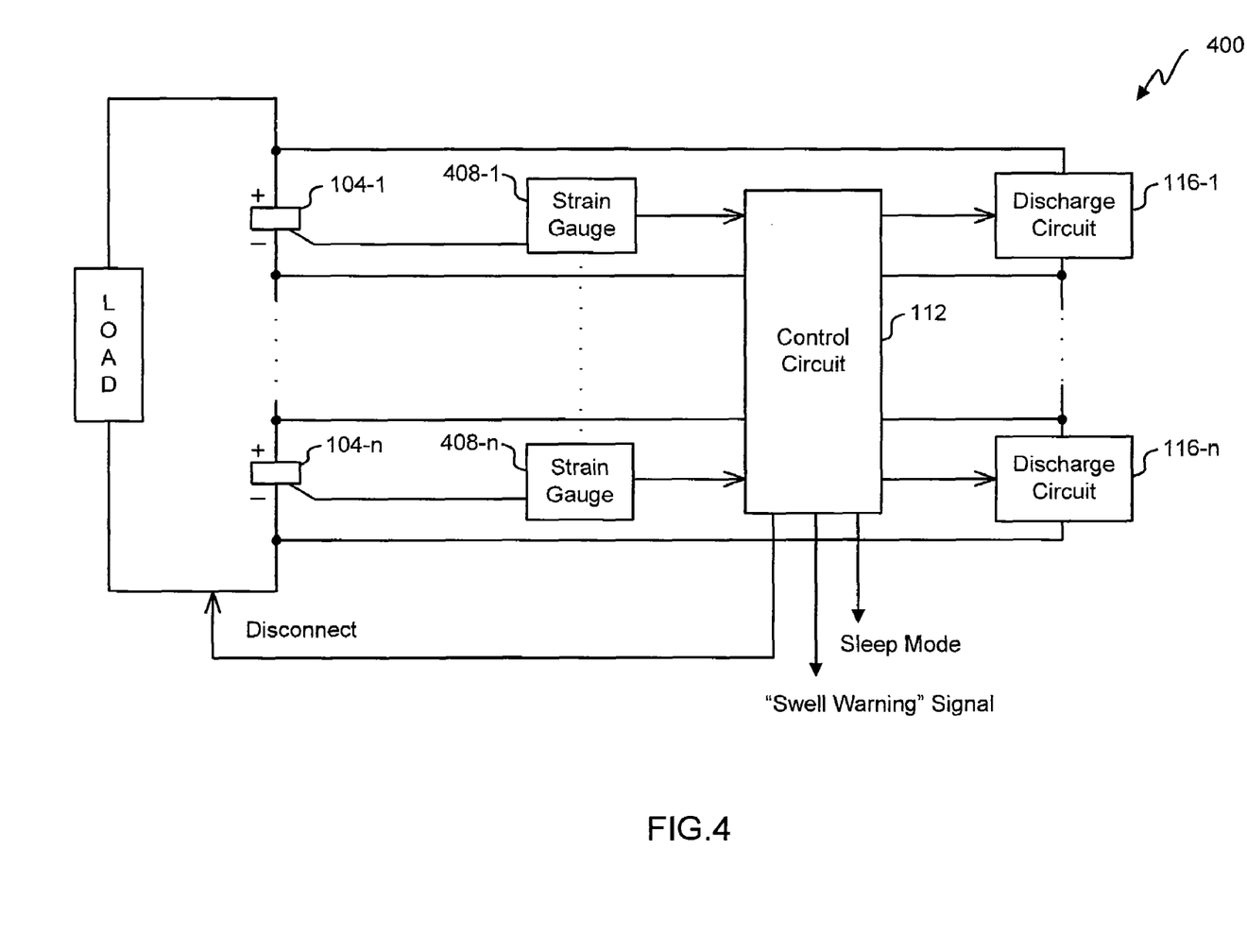
FIG. 4 is a block diagram showing the third embodiment of the present invention for preventing batteries from swelling.

FIG. 4 is a block diagram showing an anti-swell protection circuit 400 according to a third embodiment of the present invention. In this embodiment, strain gauges 408-1 through 408-*n* are included for individually monitoring the strains associated with the number of batteries 104-1 through 104-*n*, respectively, in place of the voltage monitoring circuits 108-1 through 108-*n* in the first and second embodiments. To prevent significant swelling, the strain gauges 408-1 through 408-*n* can be configured to detect the initial stage of swelling of the batteries 104-1 through 104-*n*, respectively. Strain gauges suited for measuring small strains, e.g., 1%-5%, such as semiconductor strain gauges can be thus employed for the prevention purpose. In various embodiments, the initial state of swelling to be detected may correspond to 2%, 3%, or 4% strain, for example. The strain information for each battery 104-*m* is sent to the control circuit 112. In another embodiment, information on the electrical resistance change or any other electrical property change of the sensing material in the strain gauge 408 can be utilized and sent to the control circuit 112 instead of the strain information itself.

The control circuit 112 receives the strain information associated with the batteries 104-1 through 104-*n* from the strain gauges 308-1 through 308-*n*, respectively, and determines if each of the batteries 104-1 through 104-*n* has swollen based on the strain information. When the strain value of the battery 104-*m* reaches a predetermined strain value within a normal measurement error, the control circuit sends a signal to the discharge circuit 116-*m*. The predetermined strain value may be predetermined to be less than a maximum allowable strain, beyond which normal functionalities of a LiS battery start deteriorating.

Upon receiving the signal from the control circuit 112, the discharge circuit 116-*m* starts discharging the battery 104-*m* slowly to return the battery 104-*m* to a stable state with the discharging rate, i.e., discharging current of 10 mA to 1000 mA in the present embodiment to provide a stable state for the battery 104-*m*. Thus, the stable state of the battery can be provided with the discharging current of 10 mA, 20 mA, 50 mA, 75 mA, 100 mA, 200 mA, 300 mA, 400 mA, 500 mA, or 1000 mA, for example. Note, however, the discharging current can take on any value between 50 μA and the maximum discharging current the cell manufacture will allow depending on the application. For example, the maximum discharging rate of a LiS battery from Sion Power™ is rated at 2C. This means that the LiS battery delivers the discharging current of 4.4 A for 0.5 hour at 2C with the normal capacity of 2.2 Ah. In one embodiment, the control circuit 112 may be configured to emit a "swell warning" signal with an identification of the battery 104-*m* that has swollen to the predetermined strain value so as to warn users that the battery 104-*m* with the identification has swollen. The "swell warning" signal prompts the user to take certain action: replacing the swollen battery, activating the load to resume discharging, charging the batteries with a charger, and/or other remedial actions.

If there is no user's action causing charging or discharging, the slow discharging by the discharge circuit 116-*m* continues until a predetermined discharging time period elapses. The starting point of the predetermined discharging time period is thus the time when one battery 104-*m* swells to the predetermined strain value first among the number of batteries, turning on the corresponding discharge circuit 116-*m*. The predetermined discharging time period is set by the timer internal to the control circuit 112. The entire circuit is put into a sleep mode when the predetermined discharging time period elapses. If there is no wake-up command during the sleep mode over a third predetermined time period, the load is disconnected as in the first and second embodiments.

Figure 5:
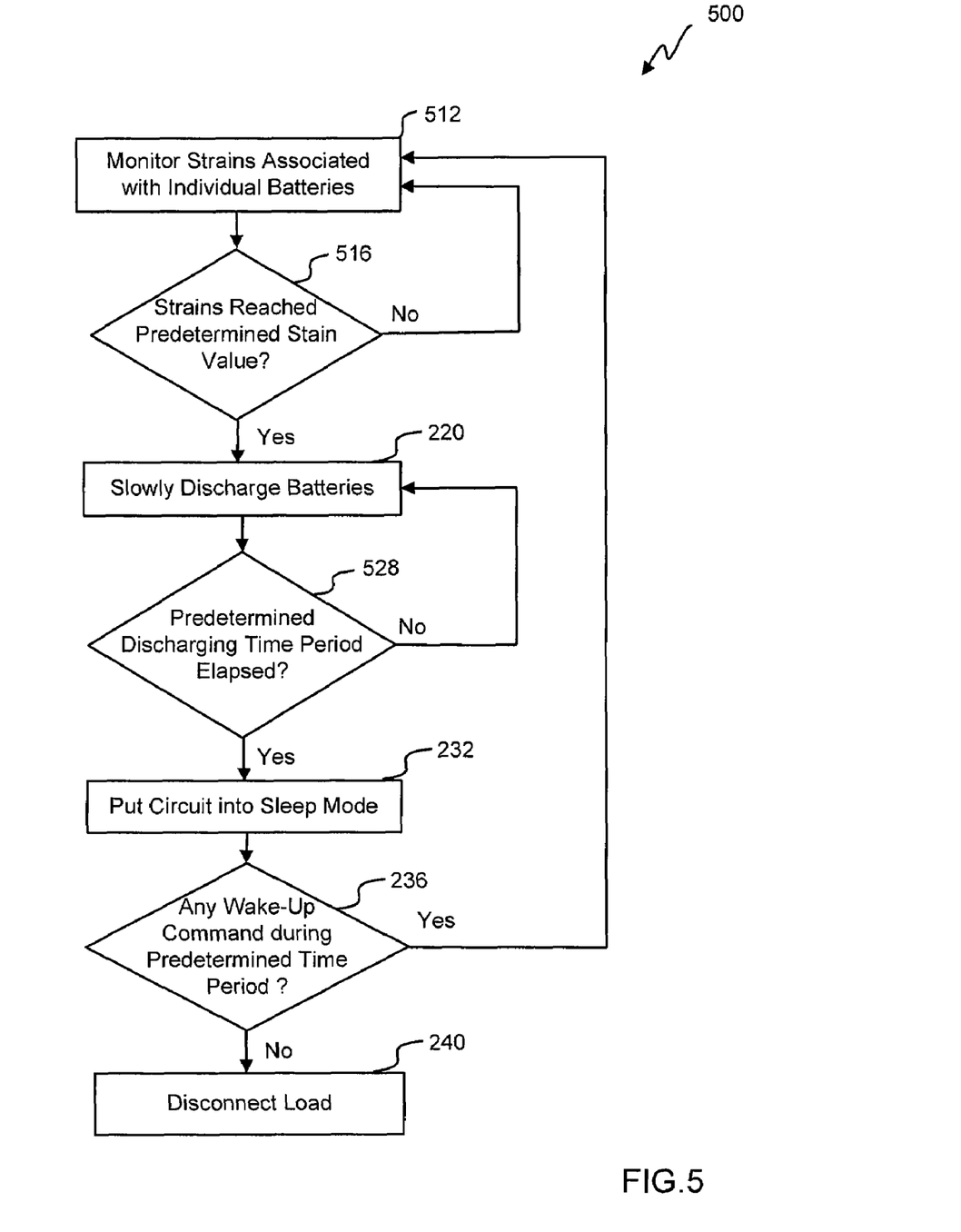
FIG. 5 is a flow diagram showing the process of the third embodiment of the present invention for preventing batteries from swelling.

FIG. 5 is a flow diagram showing an anti-swell protection process 500 according to the third embodiment of the present invention. At block 512, strains associated with individual batteries 104-1 through 104-*n* are monitored by the strain gauges 408-1 through 408-*n*, respectively. When the battery 104-*m* swells to the predetermined strain value, as determined at block 516, the corresponding discharge circuit 116-*m* starts slowly discharging the battery 104-*m* at block 220. In one embodiment, the control circuit 112 may be configured to emit the "swell warning" signal after the slow discharging started with an identification of the battery 104-*m* that has swollen to the predetermined strain value so as to notify the user of the swollen battery 104-*m*. The slow discharging continues until the predetermined discharging time period elapses, as determined at block 528. Then, at block 232, the entire circuit is put into a sleep mode. The remaining blocks are the same as those in the first and second embodiments.

A number of variations and modifications of the disclosed embodiments can also be used. For example, the sleep mode may be terminated when at least one of the batteries reaches a third predetermined voltage threshold to avoid over discharge. The third predetermined voltage threshold in this case can be an over-discharge protection voltage set by the manufacturer's over-discharge protection specification. Although the embodiments described herein concern an anti-swell protection circuit for multiple battery cells connected in series, the anti-swell protection circuit according to the present invention is configurable to a single cell or multiple cells connected in parallel.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

While the principles of the disclosure have been described above in connection with specific apparatuses and methods, it is to be clearly understood that this description is made only by way of example and not as limitation on the scope of the disclosure.

What is claimed is:

1. A protection circuit configured to be coupled to a battery and a load for preventing the battery from swelling, the protection circuit comprising:
   a voltage monitoring circuit that monitors a voltage across the battery;
   a control circuit that receives voltage information from the voltage monitoring circuit; and
   a discharge circuit that turns on to discharge the battery upon receiving a first signal from the control circuit,
   wherein the control circuit comprises:
      a timer that sets predetermined time periods;
      a signaling section that outputs the first signal to the discharge circuit after a first predetermined time period if the voltage stays above a first predetermined voltage threshold without charging or discharging to the load for the first predetermined time period;
      a sleep mode applying section that applies a sleep mode when the voltage falls below a second predetermined voltage threshold; and
      a load disconnecting section that disconnects the load if a wake-up command is not issued during the sleep mode for a third predetermined time period.

2. The protection circuit according to claim 1, wherein:
   the discharge circuit turns off to stop the discharging of the battery upon receiving a second signal from the control circuit, wherein the signaling section outputs the second signal to the discharge circuit when the voltage falls below the second predetermined voltage threshold; and
   the sleep mode applying section applies the sleep mode after a second predetermined time period if the voltage stays below the second predetermined voltage threshold without charging or discharging to the load for the second predetermined time period.

3. The protection circuit according to claim 1, further comprising:
   a temperature measuring device,
   wherein the control circuit receives temperature information from the temperature measuring device and determines the predetermined time periods based on the temperature information for the timer.

4. The protection circuit according to claim 1, wherein the control circuit further comprises:
   a third signaling section that emits a third signal after the discharge circuit turns on to discharge the battery, whereby a user is warned of a status of the battery.

5. The protection circuit according to claim 1, wherein the battery is a Lithium Sulfur battery.

6. The protection circuit according to claim 1, wherein the discharge circuit discharge the battery with a discharge current value in a range between 10 mA and 1000 mA.

7. The protection circuit according to claim 1, wherein:
   the battery is a plurality of batteries;
   the voltage monitoring circuit is a plurality of voltage monitoring circuits respectively coupled to the plurality of batteries; and
   the discharge circuit is a plurality of discharge circuits respectively coupled to the plurality of batteries and respectively coupled to the plurality of voltage monitoring circuits through the control circuit, wherein:
a first voltage monitoring circuit monitors a first voltage across a first battery;
a second voltage monitoring circuit monitors a second voltage across a second battery;
the control circuit receives the voltage information from the first and second voltage monitoring circuits, respectively;
a first discharge circuit turns on to discharge the first battery upon receiving a fourth signal from the control circuit; and
a second discharge circuit turns on to discharge the second battery upon receiving a fifth signal from the control circuit, wherein the control circuit comprises:
the signaling section that outputs the fourth signal to the first discharge circuit after the first predetermined time period if the first voltage stays above the first predetermined voltage threshold without charging or discharging to the load for the first predetermined time period, and the fifth signal to the second discharge circuit after the first predetermined time period if the second voltage stays above the first predetermined voltage threshold without charging or discharging to the load for the first predetermined time period; and
the sleep mode applying section that applies the sleep mode when at least one voltage falls below the second predetermined voltage threshold.

8. The protection circuit according to claim 7, wherein:
the first discharge circuit turns off to stop the discharging of the first battery upon receiving a sixth signal from the control circuit, wherein the signaling section outputs the sixth signal to the first discharge circuit when the first voltage falls below the second predetermined voltage threshold;
the second discharge circuit turns off to stop the discharging of the second battery upon receiving a seventh signal from the control circuit, wherein the signaling section outputs the seventh signal to the second discharge circuit when the second voltage falls below the second predetermined voltage threshold; and
the sleep mode applying section applies the sleep mode after the second predetermined time period if at least one voltage stays below the second predetermined voltage threshold without charging or discharging to the load for the second predetermined time period.

9. A protection circuit configured to be coupled to a battery and a load for preventing the battery from swelling, the protection circuit comprising:
a swell monitoring device that monitors a swell associated with the battery;
a control circuit that receives swell information from the swell monitoring device; and
a discharge circuit that turns on to discharge the battery upon receiving a signal from the control circuit,
wherein the control circuit comprises:
a timer that sets predetermined time periods;
a signaling section that outputs the signal to the discharge circuit when the swell associated with the battery reaches a predetermined swell value;
a sleep mode applying section that applies a sleep mode after a predetermined discharging time period if the discharge circuit is on for the predetermined discharging time period; and
a load disconnecting section that disconnects the load if a wake-up command is not issued during the sleep mode for a predetermined sleep time period.

10. The protection circuit according to claim 9, wherein the battery is a Lithium Sulfur battery.

11. The protection circuit according to claim 9, wherein:
the battery is a plurality of batteries;
the swell monitoring device is a plurality of swell monitoring devices respectively coupled to the plurality of batteries; and
the discharge circuit is a plurality of discharge circuits respectively coupled to the plurality of batteries and respectively coupled to the plurality of swell monitoring devices through the control circuit, wherein:
a first swell monitoring device monitors a first swell associated with a first battery;
a second swell monitoring device monitors a second swell associated with a second battery;
a control circuit receives the swell information from the first and second swell monitoring devices, respectively;
a first discharge circuit turns on to discharge the first battery upon receiving a first signal from the control circuit; and
a second discharge circuit turns on to discharge the second battery upon receiving a second signal from the control circuit, wherein the control circuit comprises:
the signaling section that outputs the first signal to the first discharge circuit when the first swell associated with the first battery reaches the predetermined swell value, and the second signal to the second discharge circuit when the second swell associated with the second battery reaches the predetermined swell value; and
the sleep mode applying section that applies the sleep mode if the discharging of at least one battery continues for the predetermined discharging time period.

12. The protection circuit according to claim 11, wherein the control circuit further comprises:
a third signaling section that emits a third signal after at least one discharge circuit turns on for discharging, the third signal having an identification of at least one battery with the swell that has reached the predetermined swell value, whereby a user is warned of a status of the at least one battery with the identification.

13. A method for preventing a battery from swelling, the method comprising steps of:
monitoring a voltage across the battery;
setting predetermined time periods;
discharging the battery through a discharge circuit after a first predetermined time period if the voltage stays above a first predetermined voltage threshold without charging or discharging to a load for the first predetermined time period;
applying a sleep mode when the voltage falls below a second predetermined voltage threshold; and
disconnecting the load if a wake-up command is not issued during the sleep mode for a third predetermined time period.

14. The method according to claim 13, further comprising a step of:
stopping the discharging of the battery when the voltage falls below the second predetermined voltage threshold,
wherein the step of applying the sleep mode is performed after a second predetermined time period if the voltage stays below the second predetermined voltage threshold without charging or discharging to the load for the second predetermined time period.

15. The method according to claim 13, further comprising steps of:
   measuring ambient temperature; and
   determining the predetermined time periods based on results obtained in the measuring step.

16. The method according to claim 13, further comprising a step of:
   emitting a signal after the discharging starts, whereby a user is warned of a status of the battery.

17. The method according to claim 13, wherein the discharging is performed with a discharge current value in a range between 10 mA and 1000 mA.

18. The method according to claim 13, wherein:
   the battery is a plurality of batteries;
   in the monitoring step, a first voltage across a first battery is monitored, and a second voltage across a second battery is monitored;
   in the discharging step, the first battery is discharged through a first discharge circuit coupled to the first battery after the first predetermined time period if the first voltage stays above the first predetermined voltage threshold without charging or discharging to the load for the first predetermined time period, and the second battery is discharged through a second discharge circuit coupled to the second battery after the first predetermined time period if the second voltage stays above the first predetermined voltage threshold without charging or discharging to the load for the first predetermined time period; and
   in the applying step, the sleep mode is applied when at least one voltage falls below the second predetermined voltage threshold.

19. The method according to claim 18, further comprising a step of
   stopping the discharging of the first battery when the first voltage falls below the second predetermined voltage threshold, and the discharging of the second battery when the second voltage falls below the second predetermined voltage threshold, wherein
   the step of applying the sleep mode is performed after the second predetermined time period if the voltage across at least one battery stays below the second predetermined voltage threshold without charging or discharging to the load for the second predetermined time period.

20. A method for preventing a battery from swelling, the method comprising steps of:
   monitoring battery strain by strain gauge;
   a control circuit receives battery strain information from strain gauge; and
   wherein the control circuit determines battery swell based on received battery strain information;
   discharging the battery through a discharge circuit when the swell associated with the battery reaches a predetermined swell value;
   applying a sleep mode after a predetermined discharging time period; and
   disconnecting the load if a wake-up command is not issued during the sleep mode for a predetermined sleep time period.

21. The method according to claim 20, wherein the discharging is performed with a discharge current value in a range between 10 mA and 1000 mA.

22. The method according to claim 20, wherein:
   the battery is a plurality of batteries;
   in the monitoring step, a first swell across a first battery is monitored, and a second swell across a second battery is monitored; and
   in the discharging step, the first battery is discharged through a first discharge circuit coupled to the first battery when the first swell associated with the first battery reaches the predetermined swell value, and the second battery is discharged through a second discharge circuit coupled to the second battery when the second swell associated with the second battery reaches the predetermined swell value.

23. The method according to claim 22, further comprising a step of:
   emitting a signal after the discharging of at least one battery starts, wherein the signal includes an identification of at least one battery having the swell that has reached the predetermined swell value, whereby a user is warned of a status of the at least one battery with the identification.

* * * * *